US012333997B2

United States Patent
(12) United States Patent
Kim et al.

(10) Patent No.: US 12,333,997 B2
(45) Date of Patent: Jun. 17, 2025

(54) DISPLAY DEVICE

(71) Applicant: Samsung Display Co., LTD., Yongin-si (KR)

(72) Inventors: Soo Yeon Kim, Yongin-si (KR); Tae Gon Im, Yongin-si (KR); Jong Jae Lee, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 18/103,542

(22) Filed: Jan. 31, 2023

(65) Prior Publication Data

US 2023/0386393 A1 Nov. 30, 2023

(30) Foreign Application Priority Data

May 30, 2022 (KR) ........................ 10-2022-0066037

(51) Int. Cl.
*G09G 3/32* (2016.01)
*G09G 3/3266* (2016.01)

(52) U.S. Cl.
CPC ............. *G09G 3/32* (2013.01); *G09G 3/3266* (2013.01); *G09G 2310/0267* (2013.01); *G09G 2310/061* (2013.01)

(58) Field of Classification Search
CPC ...... G09G 3/32; G09G 3/3233; G09G 3/3266; G09G 2310/0267; G09G 2310/061
See application file for complete search history.

(56) References Cited

U.S. PATENT DOCUMENTS 11,127,359 B2 9/2021 Yuan et al.
2021/0125568 A1 4/2021 Yuan et al.
2021/0201804 A1 7/2021 Feng et al.
2021/0201805 A1* 7/2021 Feng .................... G09G 3/3258

* cited by examiner

*Primary Examiner* — Dennis P Joseph
(74) *Attorney, Agent, or Firm* — KILE PARK REED & HOUTTEMAN PLLC

(57) ABSTRACT

A display device includes a pixel electrically connected to a first gate line and a second gate line and disposed in a first row, a pixel electrically connected to the second gate line and a reset line and disposed in a second row after the first row, a pixel electrically connected to a third gate line and a fourth gate line and disposed in a third row after the second row, and a gate driver supplying first to fourth gate signals to the first to fourth gate lines and supplying a reset signal to the reset line. The gate driver supplies the reset signal and the third gate signal of a same timing during an active period, and supplies the reset signal having a high level and the third gate signal having a low level during a rest period.

12 Claims, 13 Drawing Sheets

DISPLAY DEVICE

CROSS-REFERENCE TO RELATED APPLICATION(S)

This application claims priority to and benefits of Korean Patent Application No. 10-2022-0066037 under 35 U.S.C. § 119 filed on May 30, 2022, in the Korean Intellectual Property Office, the entire contents of which are incorporated herein by reference.

BACKGROUND

1. Technical Field

The disclosure relates to a display device.

2. Description of the Related Art

As the information society develops, the demand for display devices for displaying images has increased and diversified. For example, display devices have been applied to various electronic devices such as smartphones, digital cameras, laptop computers, navigation devices, and smart televisions. The display device may display an image without a backlight unit providing light to a display panel because pixels of the display panel include light emitting elements that may emit light by themselves.

It is to be understood that this background of the technology section is, in part, intended to provide useful background for understanding the technology. However, this background of the technology section may also include ideas, concepts, or recognitions that were not part of what was known or appreciated by those skilled in the pertinent art prior to a corresponding effective filing date of the subject matter disclosed herein.

SUMMARY

Aspects of the disclosure provide a display device that may not drive pixels of other rows in a process of sensing pixels of some rows while securing an aperture ratio by decreasing the number of gate lines.

However, aspects of the disclosure are not restricted to those set forth herein. The above and other aspects of the disclosure will become more apparent to one of ordinary skill in the art to which the disclosure pertains by referencing the detailed description of the disclosure given below.

According to an embodiment, a display device may include a pixel electrically connected to a first gate line and a second gate line and disposed in a first row; a pixel electrically connected to the second gate line and a reset line and disposed in a second row after the first row; a pixel electrically connected to a third gate line and a fourth gate line and disposed in a third row after the second row; and a gate driver supplying a first gate signal, a second gate signal, a third gate signal, and a fourth gate signal to the first gate line, the second gate line, the third gate line, and the fourth gate line and supplying a reset signal to the reset line. The gate driver supplies the reset signal and the third gate signal of a same timing during an active period, and supplies the reset signal having a high level and the third gate signal having a low level during a rest period.

The second gate signal may be delayed from the first gate signal and may partially overlap the first gate signal during the active period.

The reset signal may be delayed from the second gate signal and may partially overlap the second gate signal during the active period.

The fourth gate signal may be delayed from the third gate signal and may partially overlap the third gate signal during the active period.

In a process of sensing the pixel disposed in the first row, the first gate signal and the second gate signal may have a high level during a first period of the rest period, the second gate signal may have a high level during a second period after the first period, the first gate signal and the second gate signal may have a high level during a third period after the second period, and the second gate signal may have a high level during a fourth period after the third period.

In the process of sensing the pixel disposed in the first row, the reset signal may have a high level during the fourth period and a fifth period after the fourth period, and the third gate signal and the fourth gate signal may have a low level during the first period, the second period, the third period, the fourth period and the fifth period.

In a process of sensing the pixel disposed in the second row, the second gate signal and the reset signal may have a high level during a first period of the rest period, the reset signal may have a high level during a second period after the first period, and the second gate signal and the reset signal may have a high level during a third period after the second period.

In the process of sensing the pixel disposed in the second row, the first gate signal, the third gate signal, and the fourth gate signal may have a low level during the first period, the second period, and the third period.

The pixel disposed in the first row may include a light emitting element; a first transistor disposed between a driving voltage line and the light emitting element and supplying a driving current to the light emitting element; a second transistor electrically connecting a data line and a first node that is a gate electrode of the first transistor based on the first gate signal; and a third transistor electrically connecting a sensing line and a second node that is a source electrode of the first transistor based on the second gate signal.

The pixel disposed in the second row may include a light emitting element; a first transistor disposed between a driving voltage line and the light emitting element and supplying a driving current to the light emitting element; a second transistor electrically connecting a data line and a first node that is a gate electrode of the first transistor based on the second gate signal; and a third transistor electrically connecting a sensing line and a second node that is a source electrode of the first transistor based on the reset signal.

According to an embodiment, a display device may include a pixel electrically connected to a first gate line and a second gate line and disposed in a first row; a pixel connected electrically to the second gate line and a third gate line and disposed in a second row after the first row; a pixel electrically connected to the third gate line and a fourth gate line and disposed in a third row after the second row a pixel electrically connected to the fourth gate line and a reset line and disposed in a fourth row after the third row; a pixel electrically connected to a fifth gate line and a sixth gate line and disposed in a fifth row after the fourth row; and a gate driver supplying a first gate signal, a second gate signal, a third gate signal, a fourth gate signal, a fifth gate signal, and a sixth gate signal to the first gate line, the second gate line, the third gate line, the fourth gate line, the fifth gate line, and the sixth gate line and supplying a reset signal to the reset line. The gate driver supplies the reset signal and the fifth gate signal of a same timing during an active period, and supplies the reset signal having a high level and the fifth gate signal having a low level during a rest period.

In a process of sensing the pixel disposed in the first row, the first gate signal and second gate signal may have a high level during a first period of the rest period, the second gate signal may have a high level during a second period after the first period, the first gate signal and the second gate signal may have a high level during a third period after the second period, and the second gate signal may have a high level during a fourth period after the third period.

In the process of sensing the pixel disposed in the first row, the third gate signal may have a high level during the fourth period and a fifth period after the fourth period, the fourth gate signal may have a high level during the fifth period and a sixth period after the fifth period, the reset signal may have a high level during the sixth period and a seventh period after the sixth period, and the fifth gate signal and the sixth gate signal may have a low level during the first period, the second period, the third period, the fourth period, the fifth period, the sixth period, and the seventh period.

In a process of sensing the pixel disposed in the second row, the second gate signal and the third gate signal may have a high level during a first period of the rest period, the third gate signal may have a high level during a second period after the first period, the second gate signal and the third gate signal may have a high level during a third period after the second period, and the third gate signal may have a high level during a fourth period after the third period.

In the process of sensing the pixel disposed in the second row, the fourth gate signal may have a high level during the fourth period and a fifth period after the fourth period, the reset signal may have a high level during the fifth period and a sixth period after the fifth period, and the first gate signal, the fifth gate signal, and the sixth gate signal may have a low level during the first period, the second period, the third period, the fourth period, the fifth period, the sixth period, and the seventh period.

According to an embodiment, a display device may include a pixel electrically connected to a first gate line and a second gate line and disposed in a first row; a pixel electrically connected to the second gate line and a reset line and disposed in a second row after the first row; a pixel electrically connected to a third gate line and a fourth gate line and disposed in a third row after the second row; and a gate driver supplying a first gate signal, a second gate signal, a third gate signal and a fourth gate signal to the first gate line, the second gate line, the third gate line, and the fourth gate line and supplying a reset signal to the reset line. The gate driver may include a first stage and a second stage supplying signals; a first switch electrically connected to the first stage or the second stage based on a selection signal; a second switch electrically connected to the first stage or the second stage based on the selection signal; a third switch receiving the selection signal and electrically connected to a second output terminal; a fourth switch electrically connecting the first switch to a first output terminal and the third switch based on a first output enable signal; and a fifth switch electrically connecting the second switch to the third switch based on a second output enable signal.

The first switch may receive a selection signal having a low level to electrically connect the first stage to the fourth switch, the second switch may receive the selection signal having the low level to electrically connect the first stage to the fifth switch, and the third switch may receive the selection signal having the low level to electrically connect the fourth switch to the second output terminal.

In case that the first switch, the second switch and the third switch receive the selection signal having the low level and the fourth switch receives the first output enable signal, the first output terminal and the second output terminal may output output signals having a high level.

In case that the first switch, the second switch, and the third switch receive the selection signal having the low level and the fifth switch receives the second output enable signal, the first output terminal and the second output terminal may output output signals having a low level.

In case that the first switch, the second switch, and the third switch receive the selection signal having a high level and the fourth switch receives the first output enable signal, the first output terminal may output an output signal having a high level, and the second output terminal may output an output signal having a low level.

In accordance with the display device according to embodiments, pixels of two rows share one gate line with each other, such that the number of gate lines may be decreased, and an aperture ratio may be secured to improve luminous efficiency. The display device may decrease the number of stages of a gate driver as much as the number of gate lines is decreased, and may reduce a cost. The display device does not drive pixels after a reset line in a process of sensing pixels of some or a number of rows, and thus, may simply perform the process of sensing the pixels.

The effects of the disclosure are not limited to the aforementioned effects, and various other effects are included in the specification.

BRIEF DESCRIPTION OF THE DRAWINGS

The above and other aspects and features of the disclosure will become more apparent by describing in detail embodiments thereof with reference to the attached drawings, in which.

DETAILED DESCRIPTION OF THE EMBODIMENTS

Figure 1:
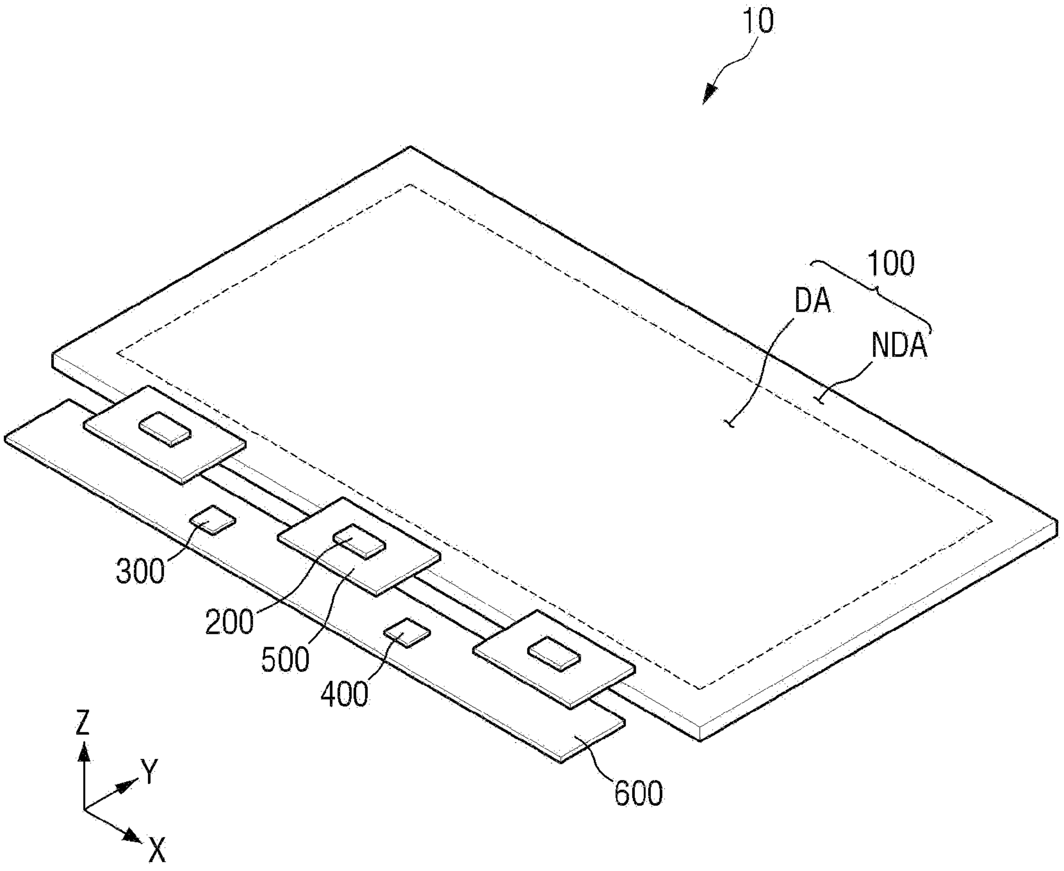
FIG. 1 is a schematic perspective view illustrating a display device according to an embodiment.

In the following description, for the purposes of explanation, numerous specific details are set forth in order to provide a thorough understanding of various embodiments or implementations of the disclosure. As used herein "embodiments" and "implementations" are interchangeable words that are non-limiting examples of devices or methods employing one or more of that which is disclosed herein. It is apparent, however, that various embodiments may be practiced without these specific details or with one or more equivalent arrangements.

In other instances, structures and devices are shown in block diagram form in order to avoid unnecessarily obscuring various embodiments. Further, various embodiments may be different, but do not have to be exclusive nor limit the disclosure. For example, specific shapes, configurations, and characteristics of an embodiment may be used or implemented in other embodiments without departing from the disclosure.

Unless otherwise specified, the illustrated embodiments are to be understood as providing features of varying detail of some ways in which the disclosure may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the disclosure.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified.

Further, in the accompanying drawings, the size and relative sizes of elements may be exaggerated for clarity and/or descriptive purposes. When an embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements.

Further, the X-axis, the Y-axis, and the Z-axis are not limited to three axes of a rectangular coordinate system, and thus the X-, Y-, and Z-axes, and may be interpreted in a broader sense. For example, the X-axis, the Y-axis, and the Z-axis may be perpendicular to one another, or may represent different directions that are not perpendicular to one another.

For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, ZZ, or the like within the spirit and the scope of the disclosure.

In the specification and the claims, the term "and/or" is intended to include any combination of the terms "and" and "or" for the purpose of its meaning and interpretation. For example, "A and/or B" may be understood to mean "A, B, or A and B." The terms "and" and "or" may be used in the conjunctive or disjunctive sense and may be understood to be equivalent to "and/or."

Although the terms "first," "second," and the like may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (for example, as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the term "below" can encompass both an orientation of above and below. Furthermore, the apparatus may be otherwise oriented (for example, rotated 90 degrees or about 90 degrees or at other orientations), and, as such, the spatially relative descriptors used herein should be interpreted accordingly.

The terms "overlap" or "overlapped" mean that a first object may be above or below or to a side of a second object, and vice versa. Additionally, the term "overlap" may include layer, stack, face or facing, extending over, covering, or partly covering or any other suitable term as would be appreciated and understood by those of ordinary skill in the art.

When an element is described as 'not overlapping' or 'to not overlap' another element, this may include that the elements are spaced apart from each other, offset from each other, or set aside from each other or any other suitable term as would be appreciated and understood by those of ordinary skill in the art.

The terms "face" and "facing" mean that a first element may directly or indirectly oppose a second element. In a case in which a third element intervenes between the first and second element, the first and second element may be understood as being indirectly opposed to one another, although still facing each other.

The terminology used herein is for the purpose of describing particular embodiments and is not intended to be limiting.

As used herein, the singular forms, "a," "an," and "the" are intended to include the plural forms as well, unless the context clearly indicates otherwise.

The terms "comprises," "comprising," "includes," and/or "including,", "has," "have," and/or "having," and variations thereof when used in this specification, specify the presence of stated features, integers, steps, operations, elements, components, and/or groups thereof, but do not preclude the presence or addition of one or more other features, integers, steps, operations, elements, components, and/or groups thereof.

It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various embodiments are described herein with reference to sectional and/or exploded illustrations that are schematic illustrations of embodiments and/or intermediate structures. As such, variations from the shapes of the illustrations as a result, for example, of manufacturing techniques and/or tolerances, are to be expected. Thus, embodiments disclosed herein should not necessarily be construed as limited to the particular illustrated shapes of regions, but are to include deviations in shapes that result from, for instance, manufacturing. In this manner, regions illustrated in the drawings may be schematic in nature, and the shapes of these regions may not reflect actual shapes of regions of a device and, as such, are not necessarily intended to be limiting.

As customary in the field, some embodiments are described and illustrated in the accompanying drawings in terms of functional blocks, units, parts, and/or modules. Those skilled in the art will appreciate that these blocks, units, parts, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, parts, and/or modules being implemented by microprocessors or other similar hardware, they may be programmed and controlled using software (for example, microcode) to perform various functions discussed herein and may optionally be driven by firmware and/or software. It is also contemplated that each block, unit, part, and/or module may be implemented by dedicated hardware, or as a combination of dedicated hardware to perform some functions and a processor (for example, one or more programmed microprocessors and associated circuitry) to perform other functions. Also, each block, unit, part, and/or module of some embodiments may be physically separated into two or more interacting and discrete blocks, units, parts, and/or modules without departing from the scope of the disclosure. Further, the blocks, units, parts, and/or modules of some embodiments may be physically combined into more complex blocks, units, parts, and/or modules without departing from the scope of the disclosure.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value.

Unless otherwise defined or implied herein, all terms (including technical and scientific terms) used herein have the same meaning as commonly understood by those skilled in the art to which this disclosure pertains. It will be further understood that terms, such as those defined in commonly used dictionaries, should be interpreted as having a meaning that is consistent with their meaning in the context of the relevant art and the disclosure, and should not be interpreted in an ideal or excessively formal sense unless clearly so defined herein.

Hereinafter, detailed embodiments are described with reference to the accompanying drawings.

FIG. 1 is a schematic perspective view illustrating a display device according to an embodiment.

Referring to FIG. 1, a display device 10 is a device that displays a moving image or a still image, and may be used as a display screen of various products such as televisions, laptop computers, monitors, billboards, and Internet of Things (IOT) as well as portable electronic devices such as mobile phones, smartphones, tablet personal computers (PCs), smart watches, watch phones, mobile communication terminals, electronic organizers, electronic books, portable multimedia players (PMPs), navigation devices, and ultra mobile PCs (UMPCs).

The display device 10 may include a display panel 100, data drivers 200, a timing controller 300, a power supply unit 400, data circuit boards 500, and a control circuit board 600.

The display panel 100 may have a rectangular shape, in plan view, having long sides in a first direction (X-axis direction) and short sides in a second direction (Y-axis direction) intersecting the first direction (X-axis direction). A corner where the long side in the first direction (X-axis direction) and the short side in the second direction (Y-axis direction) meet may be rounded with a curvature or right-angled. The shape of the display panel 100 in plan view is not limited to the rectangular shape, and may be other polygonal shapes, a circular shape, or an elliptical shape and may include shapes substantial to those shapes. The display panel 100 may be formed to be flat, but is not limited thereto. For example, the display panel 100 may include curved surface parts formed at left and right ends thereof and having a constant curvature or a variable curvature. The display panel 100 may be flexibly formed to be bent, folded, or rolled.

The display panel 100 may include a display area DA displaying an image and a non-display area NDA disposed around the display area DA. The display area DA may occupy most of the area of the display panel 100. The display area DA may be disposed at the center of the display panel 100. The display area DA may include pixels displaying an image.

Each of the pixels may include a light emitting element emitting light. The light emitting element may include at least one of an organic light emitting diode (LED) including an organic light emitting layer, a quantum dot LED including a quantum dot light emitting layer, an inorganic LED including an inorganic semiconductor, and a micro LED, but is not limited thereto.

The non-display area NDA may be disposed adjacent to the display area DA. The non-display area NDA may be an area outside the display area DA. The non-display area NDA may be disposed to surround the display area DA. The non-display area NDA may be an edge area of the display panel 100.

The non-display area NDA may include gate drivers, fan-out lines, and pad parts. The gate drivers may supply gate signals to gate lines of the display area DA. The fan-out lines may electrically connect the data drivers 200 and data lines of the display area DA to each other. The pad parts may be electrically connected to the data circuit board 500. For example, the pad parts may be disposed at an edge of one side or a side of the display panel 100, and the gate drivers may be disposed at an edge of the other side or another side of the display panel 100 adjacent to the edge of one side or a side of the display panel 100, but are not limited thereto.

The data drivers 200 may output signals and voltages for driving the display panel 100. The data drivers 200 may supply data voltages to the data lines. The data drivers 200 may supply source voltages to power lines and supply gate control signals to the gate drivers. The data driver 200 may be formed as an integrated circuit (IC) and mounted on the data circuit board 500 in a chip on film (COF) manner. As another example, the data driver 200 may be mounted on the non-display area NDA of the display panel 100 in a chip on glass (COG) manner, a chip on plastic (COP) manner, or an ultrasonic bonding manner.

The timing controller 300 may be mounted on the control circuit board 600, and may receive digital video data and a timing synchronization signal supplied from a display driving system or a graphic device through a user connector provided on the control circuit board 600. The timing controller 300 may align the digital video data to be suitable for a pixel arrangement structure based on the timing synchronization signal, and may supply the aligned digital video data to the data drivers 200. The timing controller 300 may generate data control signals and gate control signals based on the timing synchronization signal. The timing controller 300 may control supply timings of the data voltages of the data drivers 200 based on the data control signals, and control supply timings of the gate signals of the gate drivers based on the gate control signals.

The power supply unit 400 may be mounted on the control circuit board 600, and may supply source voltages to the display panel 100 and the data drivers 200. For example, the power supply unit 400 may generate a driving voltage, a low potential voltage, or an initialization voltage. The power supply unit 400 may supply the source voltages to drive the pixels and the data drivers 200.

The data circuit boards 500 may be disposed on the pad parts disposed at the edge of one side or a side of the display panel 100. The data circuit boards 500 may be attached to the pad parts using conductive adhesive members such as anisotropic conductive films. The data circuit boards 500 may be electrically connected to signal lines of the display panel 100 through anisotropic conductive films. The display panel 100 may receive the data voltages and the driving voltage from the data circuit boards 500. For example, the data circuit board 500 may be a flexible printed circuit board, a printed circuit board, or a flexible film such as a chip on film.

The control circuit board 600 may be attached to the data circuit boards 500 using an anisotropic conductive film, a low-resistance and high-reliability material such as a self-assembly anisotropic conductive paste (SAP), or the like within the spirit and the scope of the disclosure. The control circuit board 600 may be electrically connected to the data circuit boards 500. The control circuit board 600 may be a flexible printed circuit board or a printed circuit board.

Figure 2:
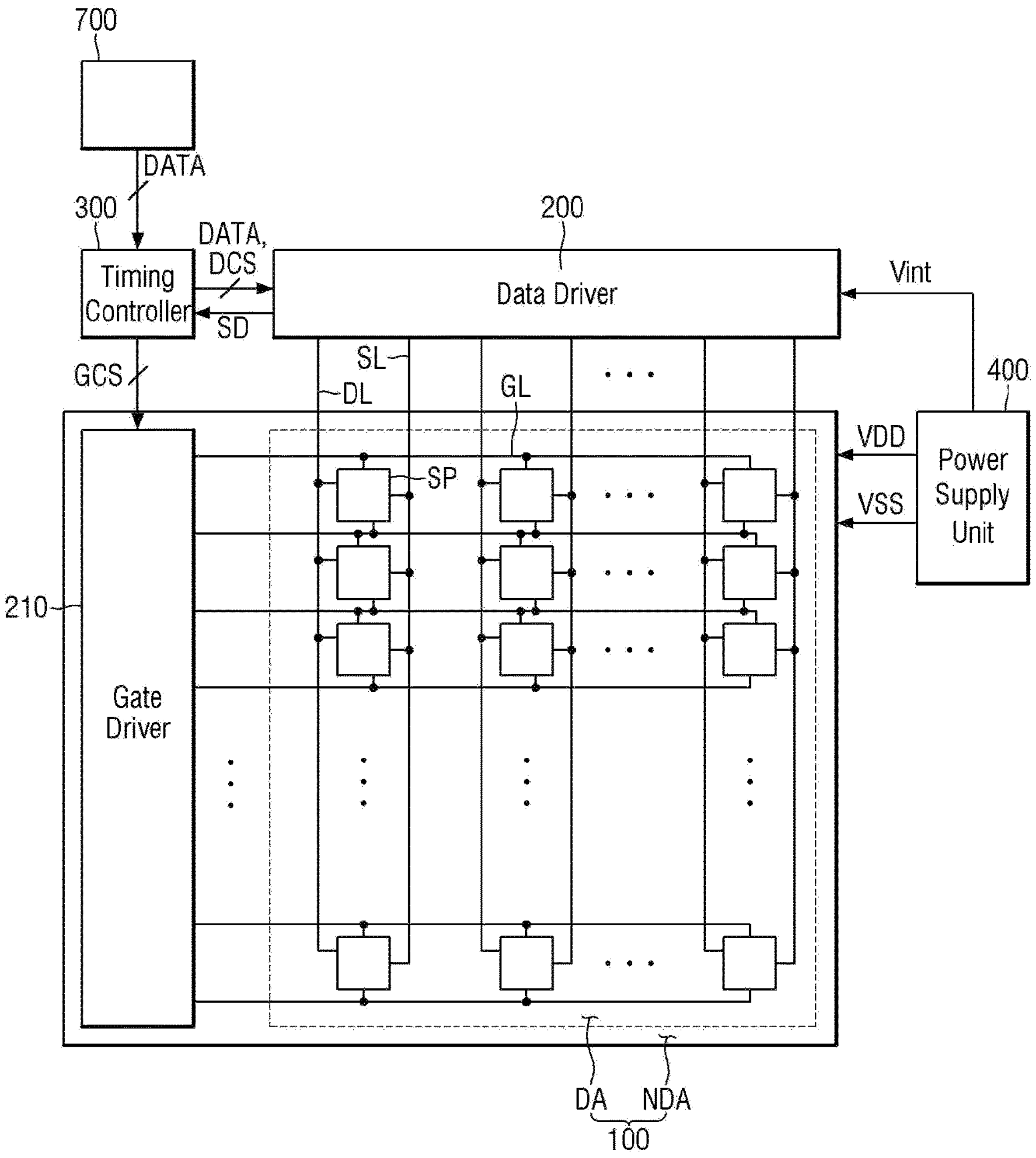
FIG. 2 is a block diagram illustrating the display device according to an embodiment.

FIG. 2 is a block diagram illustrating the display device according to an embodiment.

Referring to FIG. 2, the display device 10 may include a display panel 100, a data driver 200, a gate driver 210, a timing controller 300, a power supply unit 400, and a graphic device 700.

The display area DA of the display panel 100 may include pixels SP, and each of the pixels SP may be connected to a gate line GL, a data line DL, and a sensing line SL.

The gate lines GL may extend in the first direction (X-axis direction), and may be spaced apart from each other in the second direction (Y-axis direction). The gate lines GL may be connected between the gate driver 210 and the pixels SP. Each of the gate lines GL may supply a gate signal to the pixel SP.

The data lines DL and the sensing lines SL may extend in the second direction (Y-axis direction), and may be spaced apart from each other in the first direction (X-axis direction). The data lines DL and the sensing lines SL may be connected between the data driver 200 and the pixels SP. The data line DL may supply a data voltage to the pixel SP. The sensing line SL may supply an initialization voltage to the pixel SP, and may receive a sensing signal from the pixel SP.

The data driver 200 may receive digital video data DATA and a data control signal DCS from the timing controller 300. The data driver 200 may generate a data voltage based on the digital video data DATA and may supply the data voltage to the data line DL according to the data control signal DCS. For example, the data voltage may be supplied to a selected pixel SP of the pixels SP in synchronization with the gate signal. The data voltage may determine luminance of the pixel SP. The data driver 200 may supply sensing data SD received from the sensing line SL to the timing controller 300.

The gate driver 210 may be disposed in the non-display area NDA of the display panel 100. As an example, the gate driver 210 may be disposed at the edge of one side or a side of the display panel 100, but is not limited thereto. As another example, the gate driver 210 may be disposed at edges of both sides of the display panel 100. The gate driver 210 may receive a gate control signal GCS from the timing controller 300. The gate driver 210 may generate gate signals based on the gate control signal GCS and supply the gate signals to the gate lines GL. The gate driver 210 may sequentially supply the gate signals to gate lines GL according to a preset order.

The timing controller 300 may receive digital video data DATA and a timing synchronization signal from the graphic device 700. For example, the graphic device 700 may be a graphic card of the display device 10, but is not limited thereto. The timing controller 300 may generate the data control signal DCS and the gate control signal GCS based on the timing synchronization signal. The timing controller 300 may control a driving timing of the data driver 200 using the data control signal DCS, and may control a driving timing of the gate driver 210 using the gate control signal GCS.

The timing controller 300 may receive the sensing data SD from the data driver 200. The sensing data SD may be data obtained by sensing characteristics of a transistor of each of the pixels SP such as electron mobility or a threshold voltage of the transistor. The timing controller 300 may apply the sensing data SD to the digital video data DATA. The timing controller 300 may compensate for the characteristics of the transistor of each of the pixels SP by supplying the digital video data DATA in which the sensed data SD is reflected to the data driver 200. For example, the sensing data SD may be stored in a separate memory disposed on the control circuit board 600, but is not limited thereto.

The power supply unit 400 may generate a driving voltage VDD, a low potential voltage VSS, and an initialization voltage Vint. The power supply unit 400 may supply the driving voltage VDD to the pixels SP arranged or disposed on the display panel 100 through driving voltage lines. The power supply unit 400 may supply the low potential voltage VSS to the pixels SP arranged or disposed on the display panel 100 through low potential lines. For example, the driving voltage VDD may correspond to a high potential voltage capable of driving the pixels SP, and the driving voltage VDD and the low potential voltage VSS may be supplied in common to the pixels SP. The power supply unit 400 may supply the initialization voltage Vint to the data driver 200. The initialization voltage Vint may be supplied to each of the pixels SP through the sensing lines SL, and may initialize a first electrode of the transistor of the pixel SP or a first electrode of a light emitting element.

Figure 3:
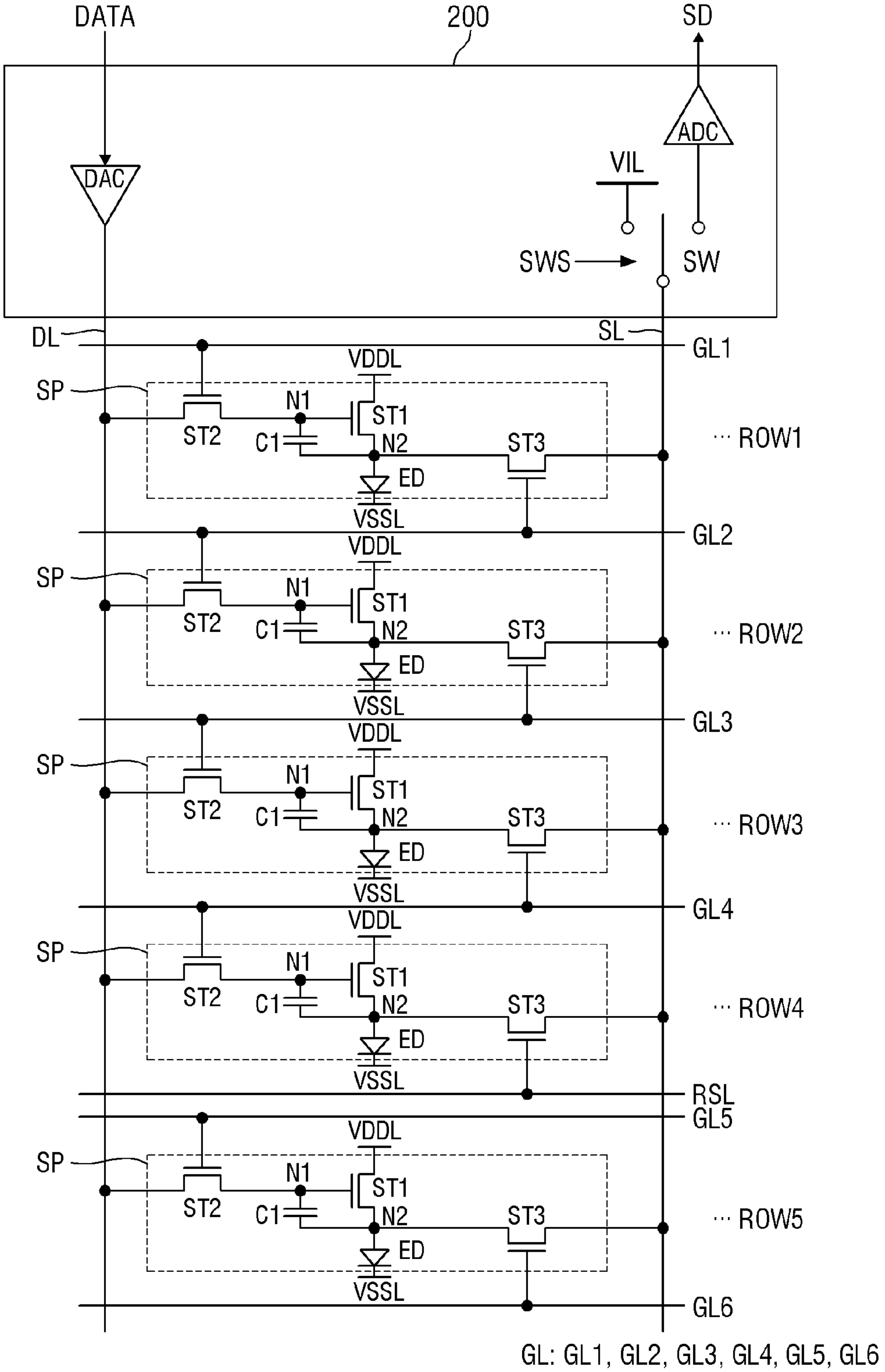
FIG. 3 is a circuit diagram illustrating a data driver and pixels of the display device according to an embodiment.

FIG. 3 is a circuit diagram illustrating a data driver and pixels of the display device according to an embodiment.

Referring to FIG. 3, each of the pixels SP may be connected to the gate line GL, the data line DL, a sensing line SL, a driving voltage line VDDL, and a low potential line VSSL. Some or a number of the pixels SP may be connected to a gate line GL disposed in a corresponding row and a gate line GL disposed in the next row. Some or a number of other of the pixels SP may be connected to the gate line GL disposed in the corresponding row and a reset line RSL.

Pixels SP disposed in a first row ROW1 may be connected to a first gate line GL1 and a second gate line GL2. Pixels SP disposed in a second row ROW2 may be connected to the second gate line GL2 and a third gate line GL3. Pixels SP disposed in a third row ROW3 may be connected to the third gate line GL3 and a fourth gate line GL4. Pixels SP disposed in a fourth row ROW4 may be connected to the fourth gate line GL4 and the reset line RSL. Pixels SP disposed in a fifth row ROW5 may be connected to a fifth gate line GL5 and a sixth gate line GL6. For example, pixels SP disposed in a 4 k-th row ROW**4*k* (here, k is a positive integer) may be connected to a 4 k-th gate line GL4*k* and the reset line RSL, but are not limited thereto. Accordingly, pixels SP of two rows share one gate line GL with each other, such that the display device 10 may decrease the number of gate lines GL and secure an aperture ratio to improve luminous efficiency. The display device 10 may decrease the number of stages of the gate driver 210** as much as the number of gate lines GL is decreased, and may reduce a cost.

The pixel SP may include first to third transistors ST1, ST2, and ST3, a first capacitor C1, and light emitting elements ED. Hereinafter, the pixel SP disposed in the first row ROW1 will be described, and the pixels SP after the second row ROW2 will be briefly described or a description thereof will be omitted.

The first transistor ST1 may include a gate electrode, a drain electrode, and a source electrode. The gate electrode of the first transistor ST1 may be connected to a first node N1, the drain electrode of the first transistor ST1 may be connected to the driving voltage line VDDL, and the source electrode of the first transistor ST1 may be connected to a second node N2. The first transistor ST1 may be a driving transistor adjusting a current flowing from the driving voltage line VDDL to the light emitting element ED according to a voltage difference between the gate electrode and the source electrode. The first transistor ST1 may control a drain-source current (or a driving current) based on a data voltage applied to the gate electrode.

The light emitting element ED may receive the driving current to emit light. The light emitting element ED may include light emitting elements ED connected to each other in series or in parallel, but is not limited thereto. A light emission amount or luminance of the light emitting element ED may be proportional to a magnitude of the driving current. The light emitting element ED may include at least one of an organic light emitting diode (LED) including an organic light emitting layer, a quantum dot LED including a quantum dot light emitting layer, an inorganic LED including an inorganic semiconductor, and a micro LED, but is not limited thereto.

A first electrode of the light emitting element ED may be connected to the second node N2. The first electrode of the light emitting element ED may be connected to the source electrode of the first transistor ST1, a drain electrode of the third transistor ST3, and a second capacitor electrode of the first capacitor C1 through the second node N2. A second electrode of the light emitting element ED may be connected to the low potential line VSSL.

The second transistor ST2 may be turned on by a first gate signal of the first gate line GL1 to connect the data line DL and the first node N1, which is the gate electrode of the first transistor ST1, to each other. The second transistor ST2 may be turned on based on the first gate signal to supply a data voltage to the first node N1. A gate electrode of the second transistor ST2 may be connected to the first gate line GL1, a drain electrode of the second transistor ST2 may be connected to the data line DL, and a source electrode of the second transistor ST2 may be connected to the first node N1. The source electrode of the second transistor ST2 may be connected to the gate electrode of the first transistor ST1 and a first capacitor electrode of the first capacitor C1 through the first node N1.

The third transistor ST3 may be turned on by a second gate signal of the second gate line GL2 to connect the sensing line SL and the second node N2, which is the source electrode of the first transistor ST1, to each other. The second gate signal may be delayed from the first gate signal, and may partially overlap the first gate signal. The third transistor ST3 may be turned on based on the second gate signal to supply an initialization voltage to the second node N2. A gate electrode of the third transistor ST3 may be connected to the second gate line GL2, the drain electrode of the third transistor ST3 may be connected to the second node N2, and a source electrode of the third transistor ST3 may be connected to the sensing line SL. The drain electrode of the third transistor ST3 may be connected to the source electrode of the first transistor ST1, the second capacitor electrode of the first capacitor C1, and the first electrode of the light emitting element ED through the second node N2.

For example, the drain electrode and the source electrode of each of the first to third transistors ST1, ST2, and ST3 are not limited to the above description, and may be formed opposite to each other. Each of the first to third transistors ST1, ST2, and ST3 may be an N-channel metal oxide semiconductor field effect transistor (MOSFET), but is not limited thereto.

The data driver 200 may include a switching element SW, an analog-to-digital converter ADC, and a digital-to-analog converter DAC.

The switching element SW may connect the sensing line SL to an initialization voltage line VIL or the analog-to-digital converter ADC based on a switching signal SWS. In case that the initialization voltage line VIL is connected to the sensing line SL, the initialization voltage line VIL may supply the initialization voltage Vint to the sensing line SL. In case that the analog-to-digital converter ADC is connected to the sensing line SL, the sensing line SL may supply the sensing signal to the analog-to-digital converter ADC, and the analog-to-digital converter ADC may convert the sensing signal to digital data to generate the sensing data SD. The analog-to-digital converter ADC may supply the sensing data SD to a compensation circuit (not illustrated) of the timing controller 300.

The digital-to-analog converter DAC may receive the digital video data DATA to which the sensing data SD is reflected, from the compensation circuit of the timing controller 300. The digital-to-analog converter DAC may convert the digital video data DATA into analog data to generate a data voltage Vdata. The digital-to-analog converter DAC may supply the data voltage Vdata to the data line DL.

Figure 4:
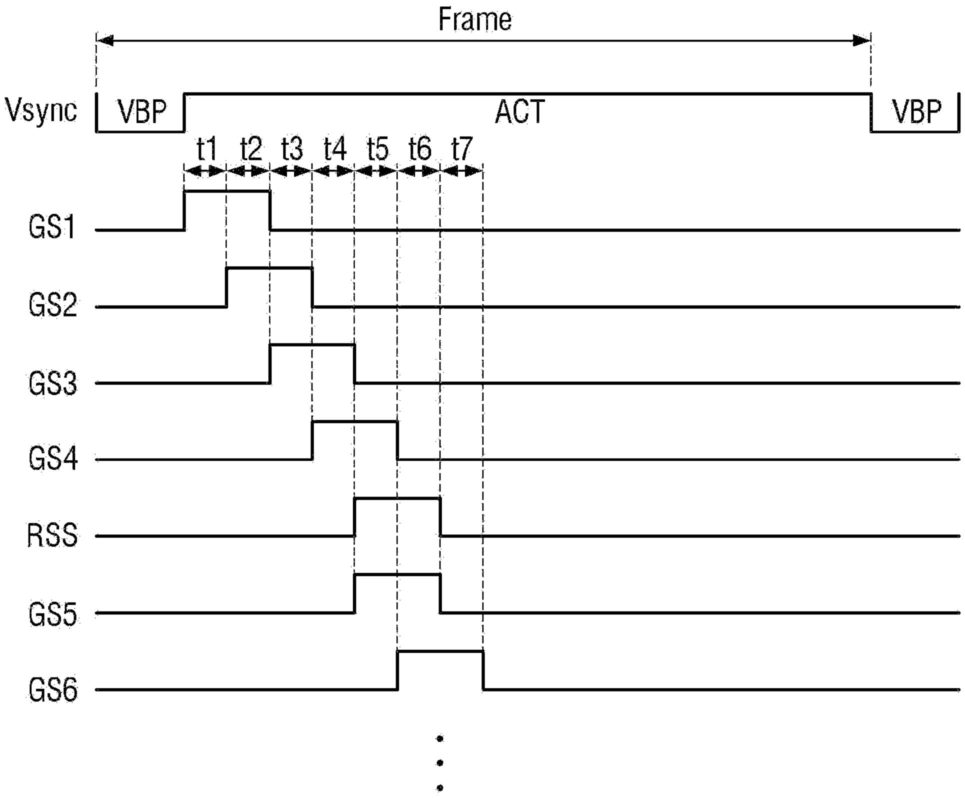
FIG. 4 is a timing diagram illustrating signals of the display device according to an embodiment.

FIG. 4 is a timing diagram illustrating signals of the display device according to an embodiment.

Referring to FIG. 4, the timing controller 300 may control the gate driver 210 based on a vertical synchronization signal Vsync. The vertical synchronization signal Vsync may have one low level and one high level during one frame period. The vertical synchronization signal Vsync may have a low level during a rest period VBP and a high level during an active period ACT. The pixels SP may emit light during the active period ACT. Pixels SP disposed in some or a number of rows among the pixels SP may be sensed by the data driver 200 during the rest period VBP, and pixels SP disposed in some or a number of other rows among the pixels SP may maintain luminance in the previous active period ACT during the rest period VBP.

A first gate signal GS1 may be supplied to the second transistor ST2 of the pixel SP of the first row ROW1, and a second gate signal GS2 may be supplied to the third transistor ST3 of the pixel SP of the first row ROW1. The pixel SP of the first row ROW1 may receive the data voltage Vdata during first and second periods t1 and t2, and may receive the initialization voltage Vint during second and third periods t2 and t3.

The second gate signal GS2 may be delayed from the first gate signal GS1, and may overlap the first gate signal GS1 during the second period t2. The second gate signal GS2 may be supplied to the second transistor ST2 of the pixel SP of the second row ROW2, and a third gate signal GS3 may be supplied to the third transistor ST3 of the pixel SP of the second row ROW2. The pixel SP of the second row ROW2 may receive the data voltage Vdata during the second and third periods t2 and t3, and may receive the initialization voltage Vint during third and fourth periods t3 and t4.

The third gate signal GS3 may be delayed from the second gate signal GS2, and may overlap the second gate signal GS2 during the third period t3. The third gate signal GS3 may be supplied to the second transistor ST2 of the pixel SP of the third row ROW3, and a fourth gate signal GS4 may be supplied to the third transistor ST3 of the pixel SP of the third row ROW3. The pixel SP of the third row ROW3 may receive the data voltage Vdata during the third and fourth periods t3 and t4, and may receive the initialization voltage Vint during fourth and fifth periods t4 and t5.

The fourth gate signal GS4 may be delayed from the third gate signal GS3, and may overlap the third gate signal GS3 during the fourth period t4. The fourth gate signal GS4 may be supplied to the second transistor ST2 of the pixel SP of the fourth row ROW4, and a reset signal RSS may be supplied to the third transistor ST3 of the pixel SP of the fourth row ROW4. The pixel SP of the fourth row ROW4 may receive the data voltage Vdata during the fourth and fifth periods t4 and t5, and may receive the initialization voltage Vint during fifth and sixth periods t5 and t6.

A fifth gate signal GS5 may be delayed from the fourth gate signal GS4, and may overlap the fourth gate signal GS4 during the fifth period t5. The fifth gate signal GS5 may have a high level at the same timing as the reset signal RSS. For example, the fifth gate signal GS5 and the reset signal RSS may have a high level during the fifth and sixth periods t5 and t6. The fifth gate signal GS5 may be supplied to the second transistor ST2 of the pixel SP of the fifth row ROW5, and a sixth gate signal GS6 may be supplied to the third transistor ST3 of the pixel SP of the fifth row ROW5. The pixel SP of the fifth row ROW5 may receive the data voltage Vdata during the fifth and sixth periods t5 and t6, and may receive the initialization voltage Vint during sixth and seventh periods t6 and t7.

The first to sixth gate signals GS1, GS2, GS3, GS4, GS5, and GS6 have the same pulse width, and may thus turn on the second transistors ST2 of the pixels SP for the same time, and the data voltage Vdata may be charged at the same charging rate in the pixels SP.

Figure 5:
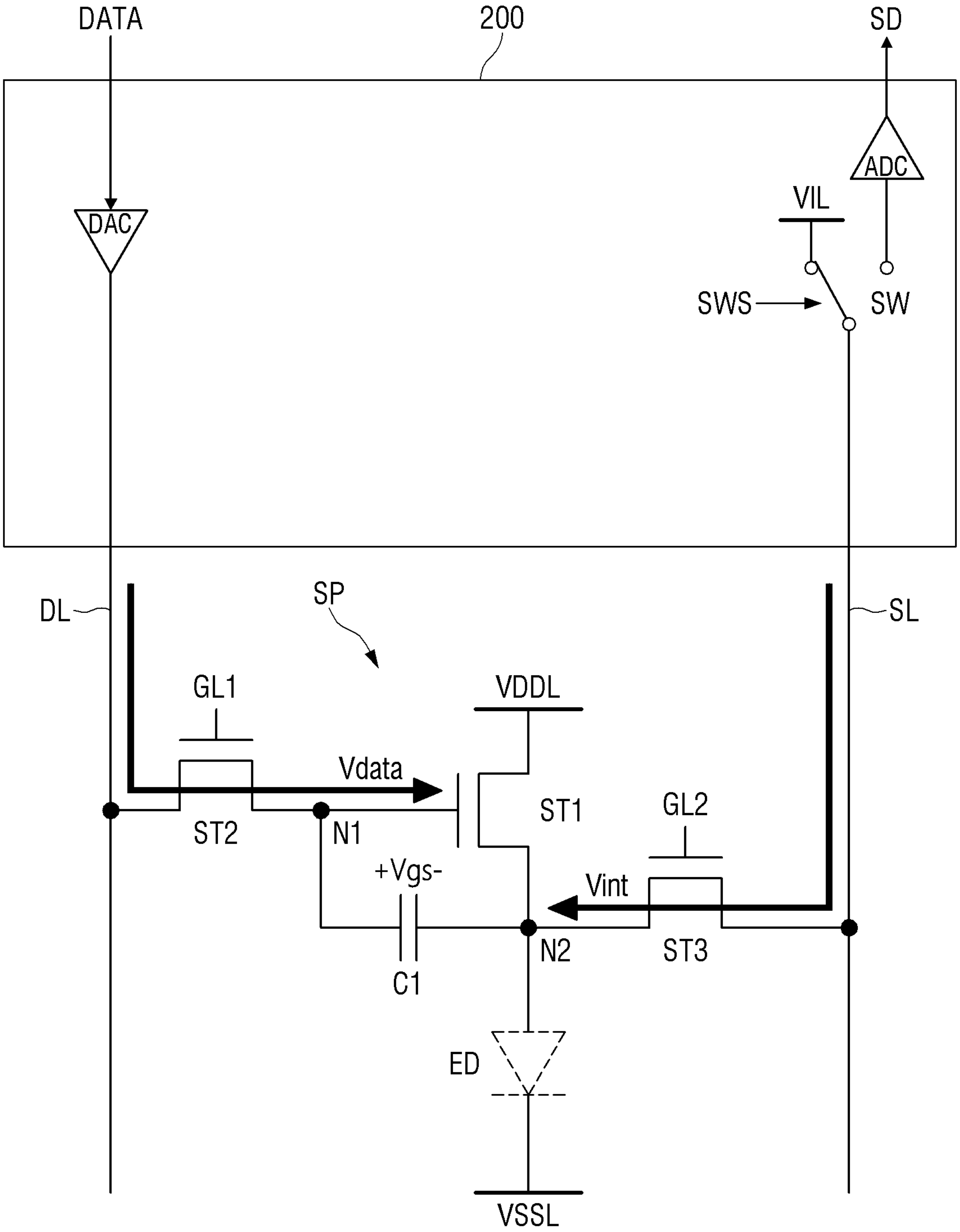
FIG. 5 is a circuit diagram illustrating an operation of a pixel of a first row during a second period of FIG. 4 in the display device according to an embodiment.

FIG. 5 is a circuit diagram illustrating an operation of a pixel of a first row during a second period of FIG. 4 in the display device according to an embodiment.

Referring to FIG. 5 in conjunction with FIG. 4, the pixel SP disposed in the first row ROW1 may receive the first gate signal GS1 having a high level (or a gate-on voltage) and the second gate signal GS2 having a high level during the second period t2 of the active period ACT.

The data line DL may supply the data voltage Vdata generated based on the digital video data DATA to the pixel SP during the second period t2. The second transistor ST2 may be turned on during the second period t2 to supply the data voltage Vdata to the first node N1, which is the gate electrode of the first transistor ST1.

The switching element SW may connect the initialization voltage line VIL to the sensing line SL during the second period t2. The initialization voltage line VIL may supply the initialization voltage Vint to the sensing line SL during the second period t2. The third transistor ST3 may be turned on during the second period t2 to supply the initialization voltage Vint to the second node N2, which is the source electrode of the first transistor ST1.

Figure 6:
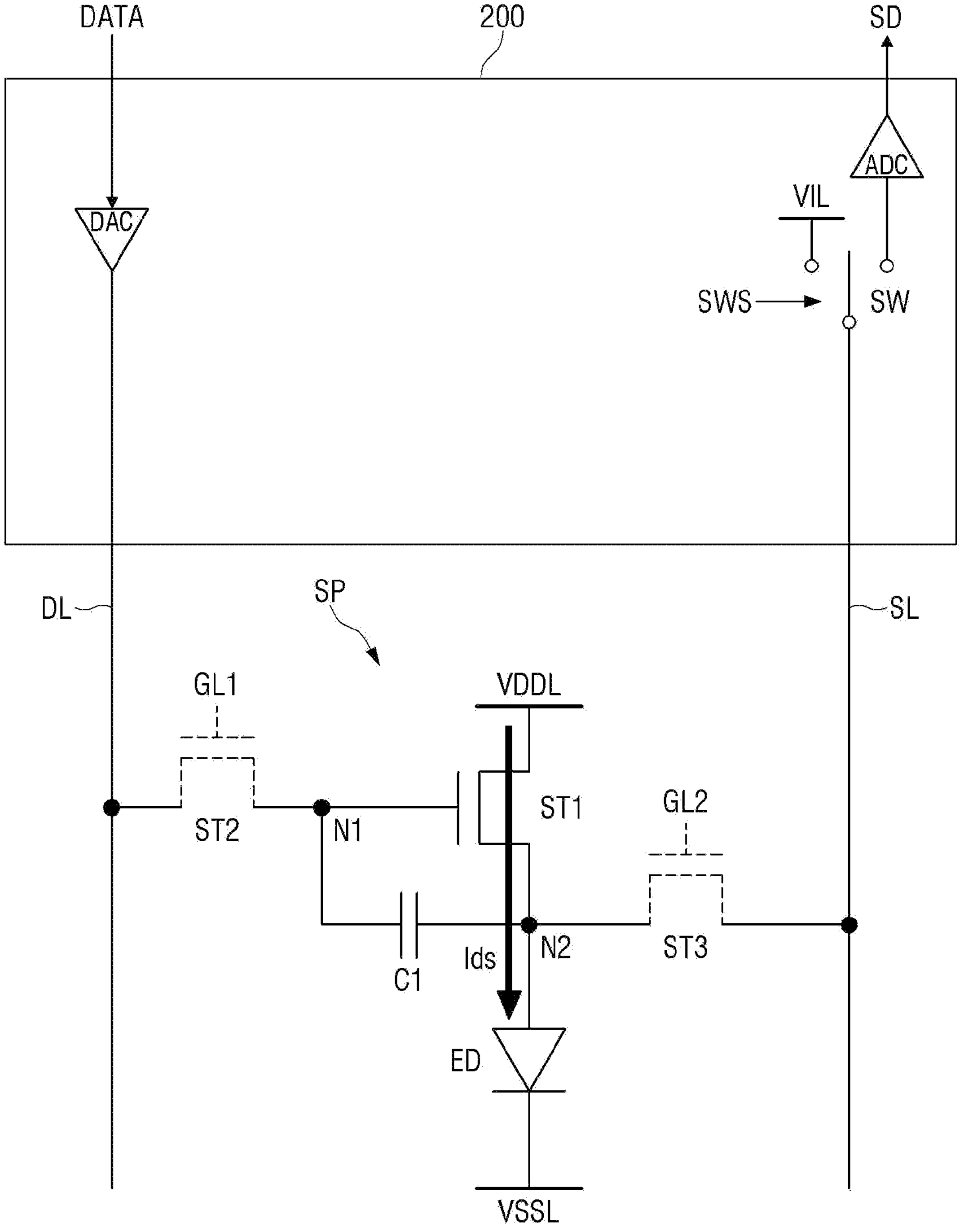
FIG. 6 is a circuit diagram illustrating an operation of the pixel of the first row after a fourth period of FIG. 4 in the display device according to an embodiment.

FIG. 6 is a circuit diagram illustrating an operation of the pixel of the first row after a fourth period of FIG. 4 in the display device according to an embodiment.

Referring to FIG. 6 in conjunction with FIG. 4, the pixel SP disposed in the first row ROW1 may receive the first gate signal GS1 having a low level (or a gate-off voltage) and the second gate signal GS2 having a low level after the fourth period t4 of the active period ACT. The second and third transistors ST2 and ST3 may be turned off after the fourth period t4.

The first transistor ST1 may be turned on by a voltage difference between the gate electrode and the source electrode or a voltage difference between the first node N1 and the second node N2 after the fourth period t4. The drain-source current Ids (or the driving current) of the first transistor ST1 may be supplied to the light emitting elements ED based on a gate-source voltage of the first transistor ST1. Accordingly, the light emitting elements ED may emit light after the fourth period t4.

Figure 7:
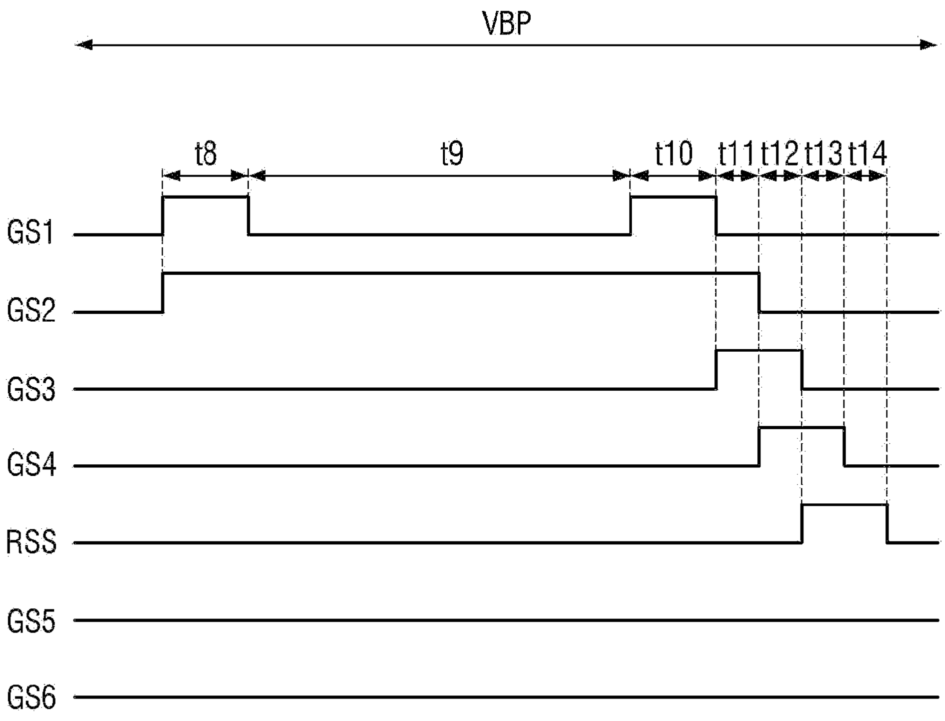
FIG. 7 is a timing diagram illustrating signals of a rest period in the display device according to an embodiment.

FIG. 7 is a timing diagram illustrating signals of a rest period in the display device according to an embodiment.

Referring to FIG. 7, the display device 10 may receive the signals illustrated in FIG. 7 to sense the pixel SP disposed in the first row ROW1 among the pixels SP. The first gate signal GS1 may have a high level during eighth and tenth periods t8 and t10 of the rest period VBP. The second gate signal GS2 may have a high level during eighth to eleventh periods t8, t9, t10, and t11. The third gate signal GS3 may have a high level during eleventh and twelfth periods t11 and t12. The fourth gate signal GS4 may have a high level during twelfth and thirteenth periods t12 and t13. The reset signal RSS may have a high level during thirteenth and fourteenth periods t13 and t14. The fifth and sixth gate signals GS5 and GS6 may have a low level during the rest period VBP.

The pixel SP disposed in the first row ROW1 among the pixels SP may be sensed by the data driver 200 during the rest period VBP. The pixels SP disposed in other rows among the pixels SP may maintain luminance in the previous active period ACT during the rest period VBP. The data driver 200 may sense characteristics such as electron mobility or a threshold voltage of the first transistor ST1 of the pixel SP disposed in the first row ROW1 during the rest period VBP.

The second gate signal GS2 has the high level during the eighth to eleventh periods t8, t9, t10, and t11, and thus, the pixel SP disposed in the second row ROW2 may receive the third gate signal GS3 having the high level during the eleventh period t11 to maintain a gate-source voltage Vgs in the previous active period ACT. Accordingly, the pixel SP disposed in the second row ROW2 may maintain luminance in the previous active period ACT.

The third gate signal GS3 may have the high level during the eleventh and twelfth periods t11 and t12, and thus, the pixel SP disposed in the third row ROW3 may receive the fourth gate signal GS4 having the high level during the twelfth period t12 to maintain a gate-source voltage Vgs in the previous active period ACT. Accordingly, the pixel SP disposed in the third row ROW3 may maintain luminance in the previous active period ACT.

The fourth gate signal GS4 may have the high level during the twelfth and thirteenth periods t12 and t13, and thus, the pixel SP disposed in fourth row ROW4 may receive the reset signal RSS having the high level during the thirteenth period t13 to maintain a gate-source voltage Vgs in the previous active period ACT. Accordingly, the pixel SP disposed in the fourth row ROW4 may maintain luminance in the previous active period ACT.

The display device 10 may drive the pixel SP disposed in the fourth row ROW4 by supplying the reset signal RSS having the same timing as the fifth gate signal GS5 during the active period ACT. The display device 10 may not supply gate signals to pixels SP disposed after the fifth row ROW5 in a process of sensing the pixel SP disposed in the first row ROW1 by supplying the reset signal RSS having the high level and the fifth gate signal GS5 having the low level during the rest period VBP. The pixels SP disposed after the fifth row ROW5 may not be affected by the process of sensing the pixel SP disposed in the first row ROW1. Accordingly, the display device 10 may simply perform a process of sensing the pixels SP even in case that one gate line GL is shared by pixels SP of two rows.

Figure 8:
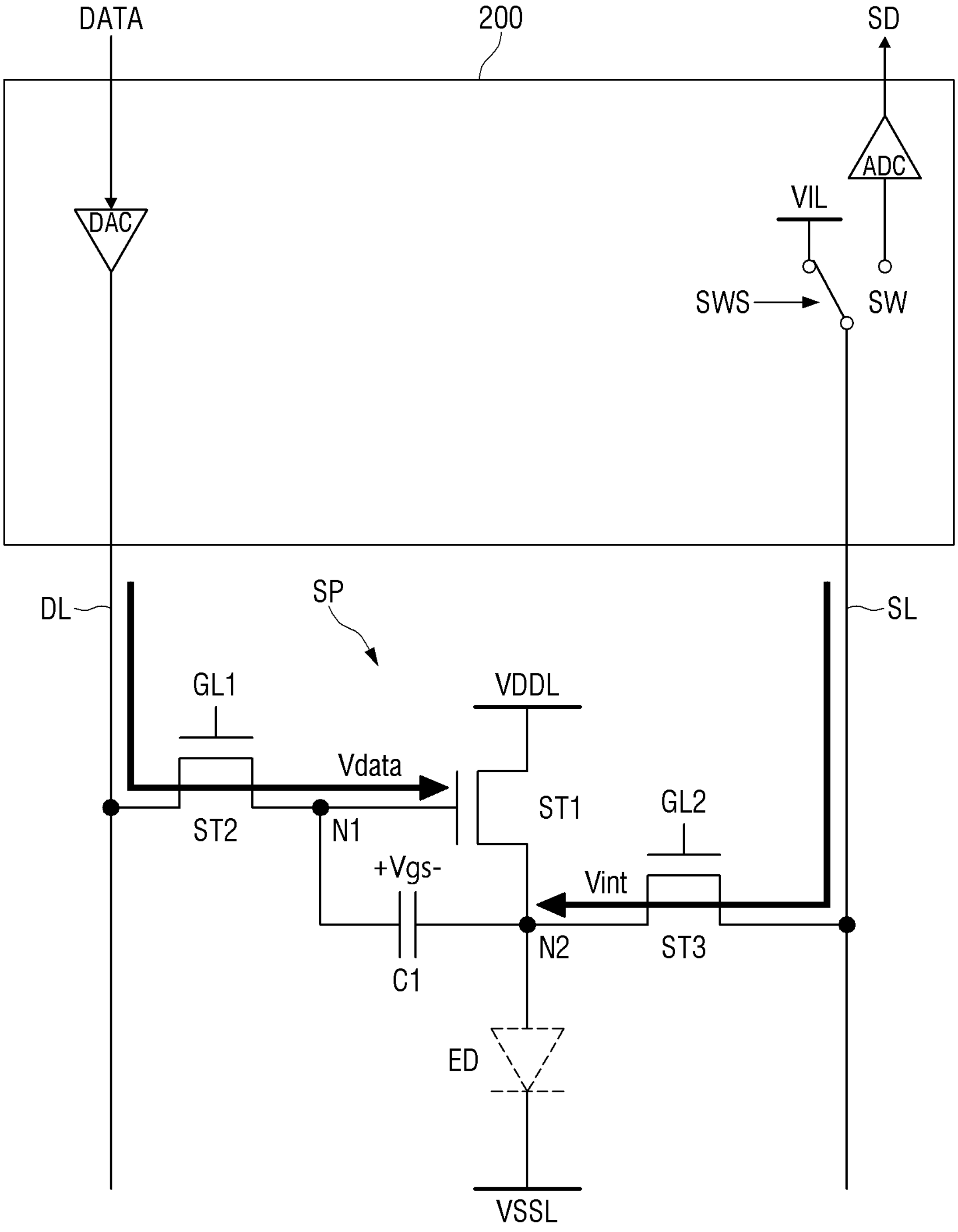
FIG. 8 is a circuit diagram illustrating an operation of the pixel during an eighth period of FIG. 7 in the display device according to an embodiment.

FIG. 8 is a circuit diagram illustrating an operation of the pixel during an eighth period of FIG. 7 in the display device according to an embodiment.

Referring to FIG. 8 in conjunction with FIG. 7, the pixel SP disposed in the first row ROW1 may receive the first gate signal GS1 having the high level (or a gate-on voltage) and the second gate signal GS2 having the high level during the eighth period t8 of the rest period VBP.

The data line DL may supply the data voltage Vdata corresponding to sensing data to the pixel SP during the eighth period t8. The second transistor ST2 may be turned on during the eighth period t8 to supply the data voltage Vdata to the first node N1, which is the gate electrode of the first transistor ST1.

The switching element SW may connect the initialization voltage line VIL to the sensing line SL during the eighth period t8. The initialization voltage line VIL may supply the initialization voltage Vint to the sensing line SL during the eighth period t8. The third transistor ST3 may be turned on during the eighth period t8 to supply the initialization voltage Vint to the second node N2, which is the source electrode of the first transistor ST1.

Figure 9:
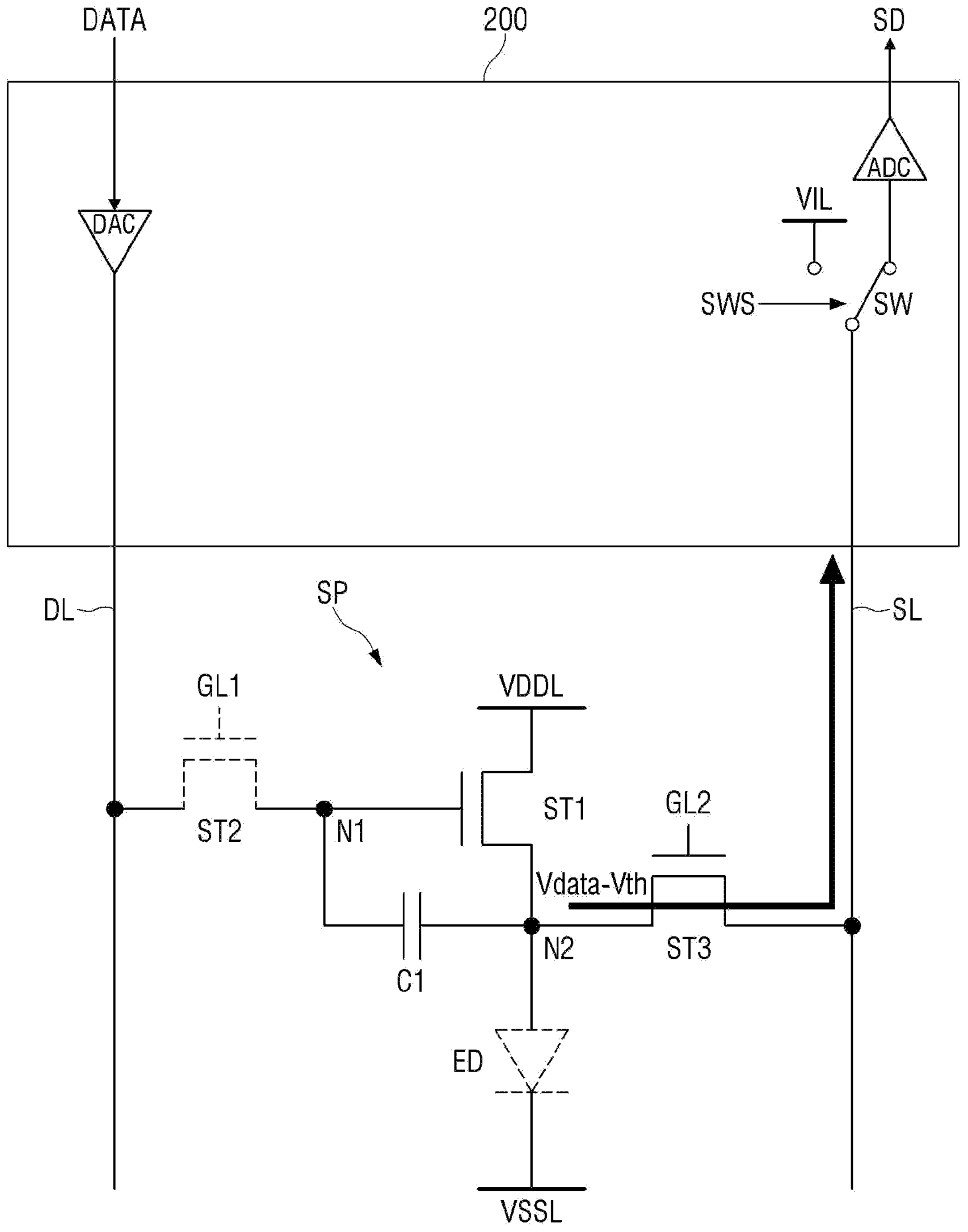
FIG. 9 is a circuit diagram illustrating an operation of the pixel during a ninth period of FIG. 7 in the display device according to an embodiment.

FIG. 9 is a circuit diagram illustrating an operation of the pixel during a ninth period of FIG. 7 in the display device according to an embodiment.

Referring to FIG. 9 in conjunction with FIG. 7, the pixel SP disposed in the first row ROW1 may receive the first gate signal GS1 having a low level (or a gate-off voltage) and the second gate signal GS2 having the high level (or a gate-on voltage) during the ninth period t9 of the rest period VBP. The second transistor ST2 may be turned off during the ninth period t9.

The switching element SW may connect the analog-to-digital converter ADC to the sensing line SL during the ninth period t9. The gate-source voltage (Vgs=Vdata−Vint) of the first transistor ST1 may be greater than the threshold voltage Vth of the first transistor ST1 during the ninth period t9 (Vgs>Vth), and the first transistor ST1 may be turned on until the gate-source voltage Vgs of the first transistor ST1 reaches the threshold voltage Vth of the first transistor ST1. Accordingly, a voltage of the second node N2, which is the source electrode of the first transistor ST1, may rise to "Vdata−Vth", and the threshold voltage Vth of the first transistor ST1 may be sampled at the second node N2. The third transistor ST3 may be turned on during the ninth period t9, and the voltage of the second node N2 may be sensed as a sensing signal through the sensing line SL.

Figure 10:
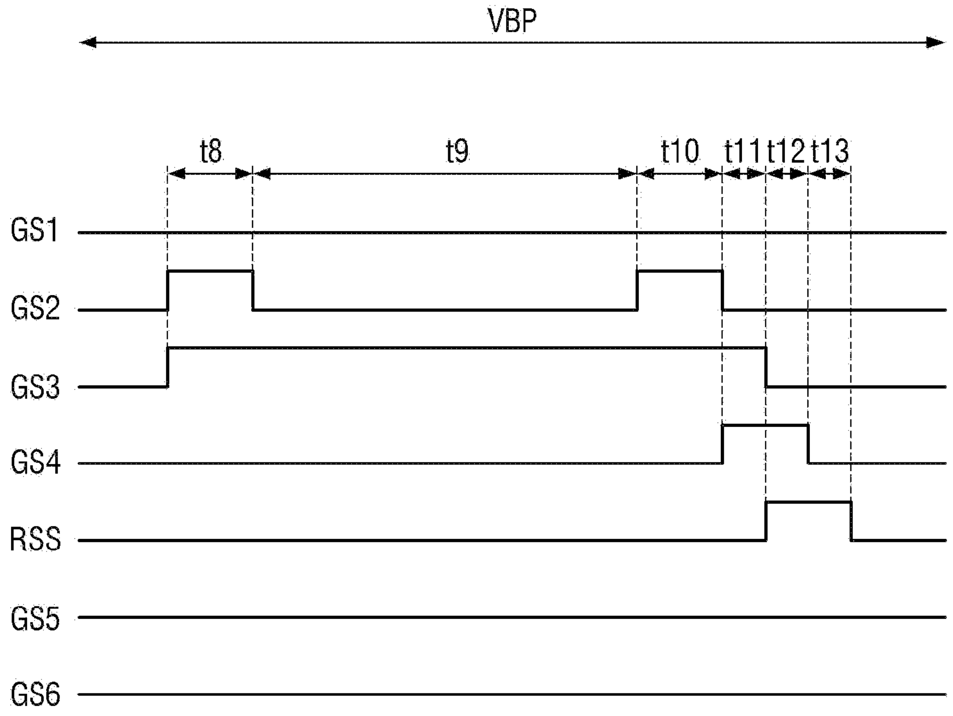
FIG. 10 is a timing diagram illustrating signals of a rest period in a display device according to an embodiment.

FIG. 10 is a timing diagram illustrating signals of a rest period in a display device according to an embodiment.

Referring to FIG. 10, the display device 10 may receive the signals illustrated in FIG. 10 to sense the pixel SP disposed in the second row ROW2 among the pixels SP. The second gate signal GS2 may have a high level during eighth and tenth periods t8 and t10 of the rest period VBP. The third gate signal GS3 may have a high level during eighth to eleventh periods t8, t9, t10, and t11. The fourth gate signal GS4 may have a high level during eleventh and twelfth periods t11 and t12. The reset signal RSS may have a high level during twelfth and thirteenth periods t12 and t13. The first, fifth, and sixth gate signals GS1, GS5, and GS6 may have a low level during the rest period VBP.

The pixel SP disposed in the second row ROW2 among the pixels SP may be sensed by the data driver 200 during the rest period VBP. The pixels SP disposed in other rows among the pixels SP may maintain luminance in the previous active period ACT during the rest period VBP. The data driver 200 may sense characteristics such as electron mobility or a threshold voltage of the first transistor ST1 of the pixel SP disposed in the second row ROW2 during the rest period VBP.

The third gate signal GS3 has the high level during the eighth to eleventh periods t8, t9, t10, and t11, and thus, the pixel SP disposed in the third row ROW3 may receive the fourth gate signal GS4 having the high level during the eleventh period t11 to maintain a gate-source voltage Vgs in the previous active period ACT. Accordingly, the pixel SP disposed in the third row ROW3 may maintain luminance in the previous active period ACT.

The fourth gate signal GS4 may have the high level during the eleventh and twelfth periods t11 and t12, and thus, the pixel SP disposed in the fourth row ROW4 may receive the reset signal RSS having the high level during the twelfth period t12 to maintain a gate-source fourth row ROW4 may maintain luminance in the previous active period ACT.

The display device 10 may drive the pixel SP disposed in the fourth row ROW4 by supplying the reset signal RSS having the same timing as the fifth gate signal GS5 during the active period ACT. The display device 10 may not supply gate signals to pixels SP disposed after the fifth row ROW5 in a process of sensing the pixel SP disposed in the second row ROW2 by supplying the reset signal RSS having the high level and the fifth gate signal GS5 having the low level during the rest period VBP. The pixels SP disposed after the fifth row ROW5 may not be affected by the process of sensing the pixel SP disposed in the second row ROW2. Accordingly, the display device 10 may simply perform a process of sensing the pixels SP even in case that one gate line GL is shared by pixels SP of two rows.

Figure 11:
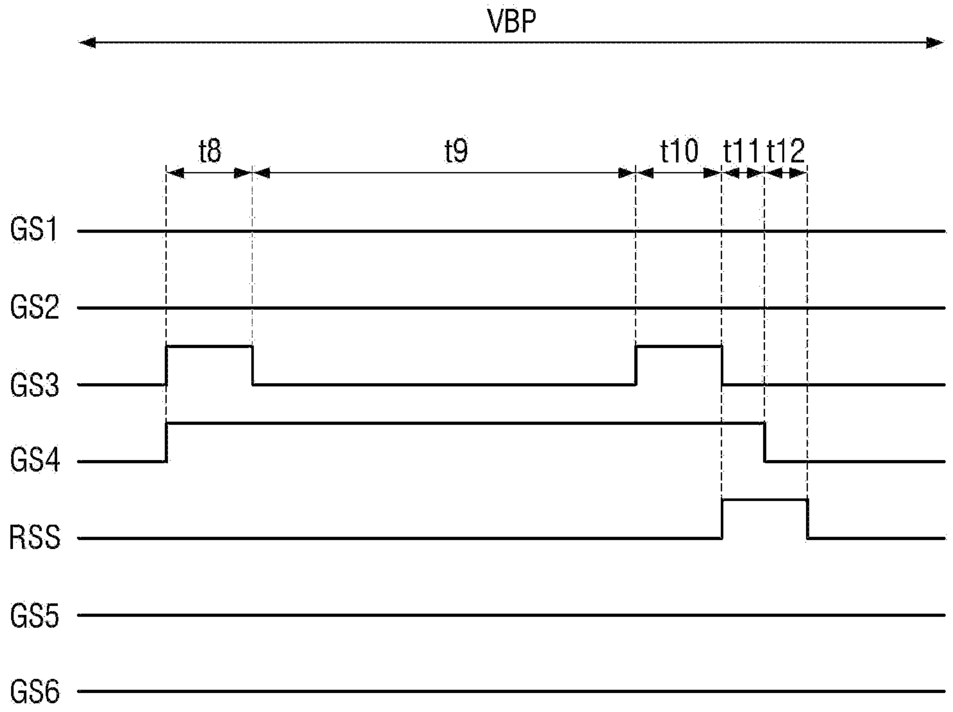
FIG. 11 is a timing diagram illustrating signals of a rest period in a display device according to an embodiment.

FIG. 11 is a timing diagram illustrating signals of a rest period in a display device according to an embodiment.

Referring to FIG. 11, the display device 10 may receive the signals illustrated in FIG. 11 to sense the pixel SP disposed in the third row ROW3 among the pixels SP. The third gate signal GS3 may have a high level during eighth and tenth periods t8 and t10 of the rest period VBP. The fourth gate signal GS3 may have a high level during eighth to eleventh periods t8, t9, t10, and t11. The reset signal RSS may have a high level during eleventh and twelfth periods t11 and t12. The first, second, fifth, and sixth gate signals GS1, GS2, GS5, and GS6 may have a low level during the rest period VBP.

The pixel SP disposed in the third row ROW3 among the pixels SP may be sensed by the data driver 200 during the rest period VBP. The pixels SP disposed in other rows among the pixels SP may maintain luminance in the previous active period ACT during the rest period VBP. The data driver 200 may sense characteristics such as electron mobility or a threshold voltage of the first transistor ST1 of the pixel SP disposed in the third row ROW3 during the rest period VBP.

The fourth gate signal GS4 has the high level during the eighth to eleventh periods t8, t9, t10, and t11, and thus, the pixel SP disposed in the fourth row ROW4 may receive the reset signal RSS having the high level during the eleventh period t11 to maintain a gate-source fourth row ROW4 may maintain luminance in the previous active period ACT.

The display device 10 may drive the pixel SP disposed in the fourth row ROW4 by supplying the reset signal RSS having the same timing as the fifth gate signal GS5 during the active period ACT. The display device 10 may not supply gate signals to pixels SP disposed after the fifth row ROW5 in a process of sensing the pixel SP disposed in the third row ROW3 by supplying the reset signal RSS having the high level and the fifth gate signal GS5 having the low level during the rest period VBP. The pixels SP disposed after the fifth row ROW5 may not be affected by the process of sensing the pixel SP disposed in the third row ROW3. Accordingly, the display device 10 may simply perform a process of sensing the pixels SP even in case that one gate line GL is shared by pixels SP of two rows.

Figure 12:
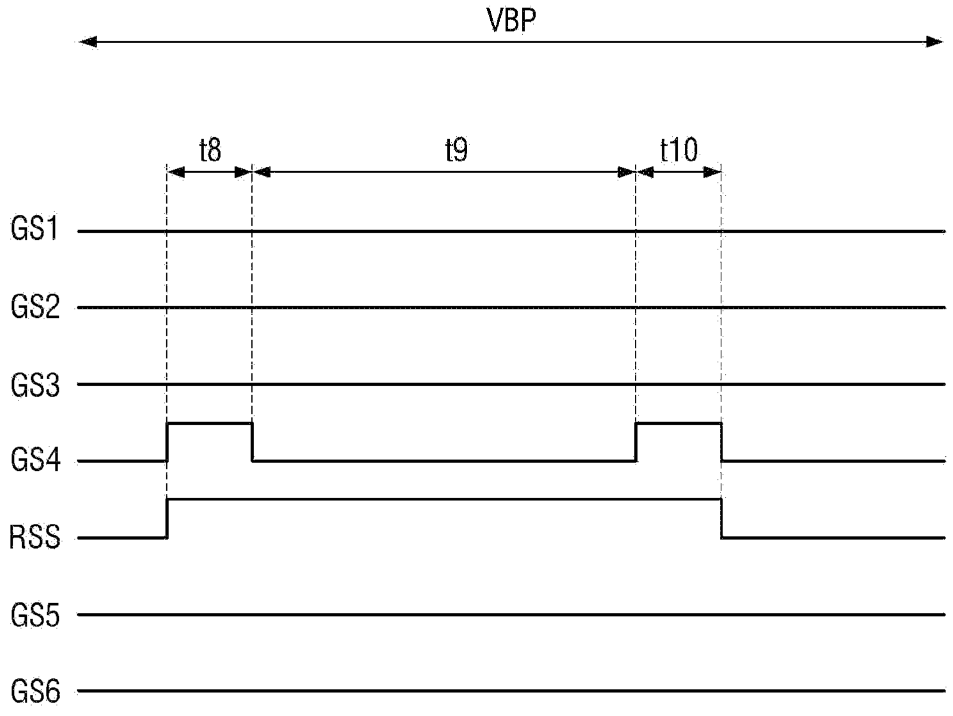
FIG. 12 is a timing diagram illustrating signals of a rest period in a display device according to an embodiment.

FIG. 12 is a timing diagram illustrating signals of a rest period in a display device according to an embodiment.

Referring to FIG. 12, the display device 10 may receive the signals illustrated in FIG. 12 to sense the pixel SP disposed in the fourth row ROW4 among the pixels SP. The fourth gate signal GS4 may have a high level during eighth and tenth periods t8 and t10 of the rest period VBP. The reset signal RSS may have a high level during eighth to tenth periods t8, t9, and t10. The first, second, third, fifth, and sixth gate signals GS1, GS2, GS3, GS5, and GS6 may have a low level during the rest period VBP.

The pixel SP disposed in the fourth row ROW4 among the pixels SP may be sensed by the data driver 200 during the rest period VBP. The pixels SP disposed in other rows among the pixels SP may maintain luminance in the previous active period ACT during the rest period VBP. The data driver 200 may sense characteristics such as electron mobility or a threshold voltage of the first transistor ST1 of the pixel SP disposed in the fourth row ROW4 during the rest period VBP.

The fourth gate signal GS4 has the high level during the eighth to tenth periods t8, t9, t10, and t11, and thus, the pixel SP disposed in the fourth row ROW4 may receive the reset signal RSS having the high level during the tenth period t10 to maintain a gate-source voltage Vgs in the previous active period ACT. Accordingly, the pixel SP disposed in the fourth row ROW4 may maintain luminance in the previous active period ACT.

The display device 10 may drive the pixel SP disposed in the fourth row ROW4 by supplying the reset signal RSS having the same timing as the fifth gate signal GS5 during the active period ACT. The display device 10 may not supply gate signals to pixels SP disposed after the fifth row ROW5 in a process of sensing the pixel SP disposed in the fourth row ROW4 by supplying the reset signal RSS having the high level and the fifth gate signal GS5 having the low level during the rest period VBP. The pixels SP disposed after the fifth row ROW5 may not be affected by the process of sensing the pixel SP disposed in the fourth row ROW4. Accordingly, the display device 10 may simply perform a process of sensing the pixels SP even in case that one gate line GL is shared by pixels SP of two rows.

Figure 13:
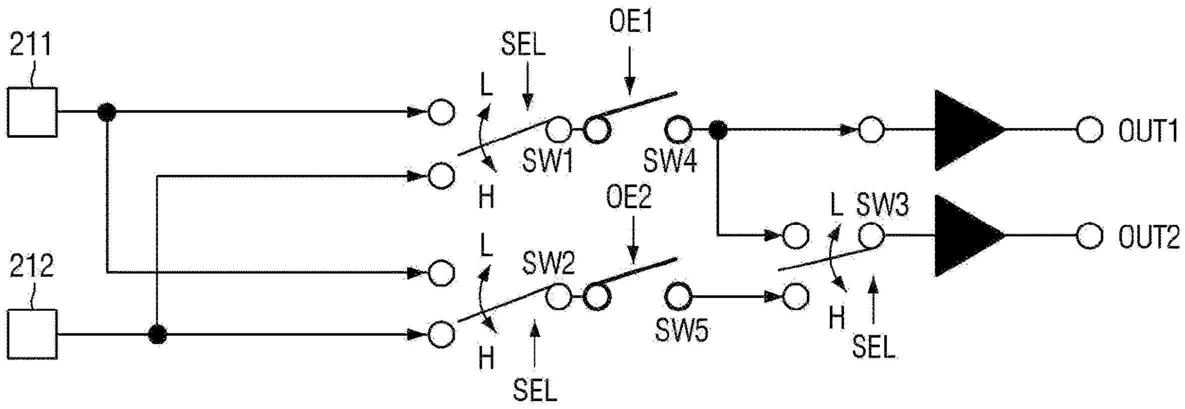
FIG. 13 is a diagram illustrating a gate driver of the display device according to an embodiment.
Figure 14:
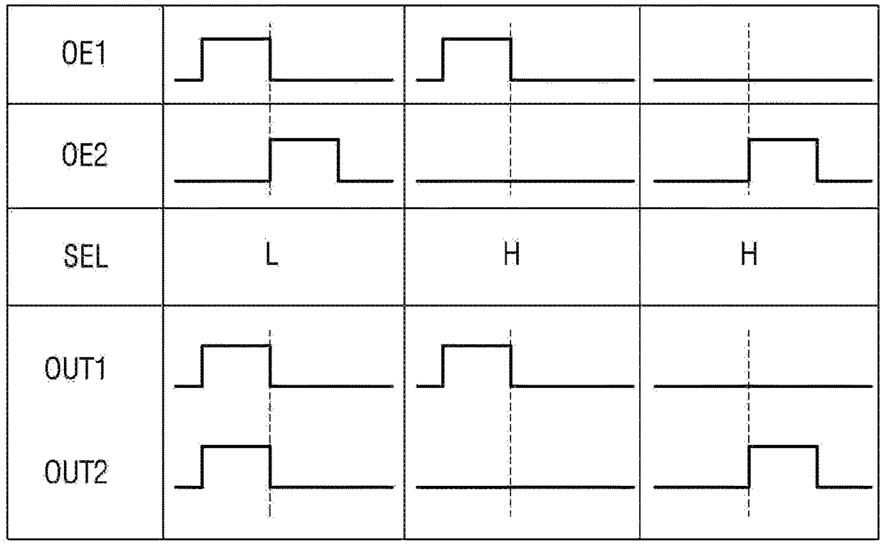
FIG. 14 is a waveform diagram illustrating outputs of the gate driver in the display device of FIG. 13.

FIG. 13 is a diagram illustrating a gate driver of the display device according to an embodiment, and FIG. 14 is a waveform diagram illustrating outputs of the gate driver in the display device of FIG. 13.

Referring to FIGS. 13 and 14, the gate driver 210 may include a first stage 211, a second stage 212, a first switch SW1, a second switch SW2, a third switch SW3, a fourth switch SW4, and a fifth switch SW5.

The first stage 211 may supply signals to the first and second switches SW1 and SW2. The second stage 212 may supply signals to the first and second switches SW1 and SW2. The first switch SW1 may receive a selection signal SEL having a low level L to connect the first stage 211 to the fourth switch SW4. The first switch SW1 may receive a selection signal SEL having a high level H to connect the second stage 212 to the fourth switch SW4. The second switch SW2 may receive the selection signal SEL having the low level L to connect the first stage 211 to the fifth switch SW5. The second switch SW2 may receive the selection signal SEL having the high level H to connect the second stage 212 to the fifth switch SW5. The third switch SW3 may receive the selection signal SEL having the low level L to connect the fourth switch SW4 to a second output terminal OUT2. The third switch SW3 may receive the selection signal SEL having the high level H to connect the fifth switch SW5 to the second output terminal OUT2. For another example, each of the first to third switches SW1, SW2, and SW3 may receive a separate signal other than the selection signal SEL to perform a corresponding operation.

The fourth switch SW4 may receive a first output enable signal OE1 to connect the first switch SW1 to a first output terminal OUT1 and the third switch SW3. The fifth switch SW5 may receive a second output enable signal OE2 to connect the second switch SW2 to the third switch SW3.

In case that the first to third switches SW1, SW2, and SW3 receive the selection signal SEL having the low level L and the fourth switch SW4 receives the first output enable signal OE1, the first and second output terminals OUT1 and OUT2 may output output signals having a high level. Referring further to FIGS. 3 and 4, the first output terminal OUT1 may be connected to the reset line RSL, and the second output terminal OUT2 may be connected to the fifth gate line GL5. Accordingly, the gate driver 210 may supply the reset signal RSS and the fifth gate signal GS5 that have the high level during the fifth and sixth periods t5 and t6. The display device 10 may drive the pixel SP disposed in the fourth row ROW4 by supplying the reset signal RSS having the same timing as the fifth gate signal GS5 during the active period ACT.

In case that the first to third switches SW1, SW2, and SW3 receive the selection signal SEL having the low level L and the fifth switch SW5 receives the second output enable signal OE2, the first and second output terminals OUT1 and OUT2 may output output signals having a low level. Referring further to FIGS. 3 and 4, the first output terminal OUT1 may be connected to the reset line RSL, and the second output terminal OUT2 may be connected to the fifth gate line GL5. Accordingly, the gate driver 210 may supply the reset signal RSS and the fifth gate signal GS5 that have the low level during the seventh period t7.

In case that the first to third switches SW1, SW2, and SW3 receive the selection signal SEL having the high level H and the fourth switch SW4 receives the first output enable signal OE1, the first output terminal OUT1 may output an output signal having a high level, and the second output terminal OUT2 may output an output signal having a low level. Referring further to FIGS. 3 and 7, the first output terminal OUT1 may be connected to the reset line RSL, and the second output terminal OUT2 may be connected to the fifth gate line GL5. Accordingly, the gate driver 210 may supply the reset signal RSS having the high level and the fifth gate signal GS5 having the low level during the thirteenth and fourteenth periods t13 and t14. The display device 10 may not supply gate signals to the pixels SP disposed after the fifth row ROW5 in the process of sensing the pixel SP disposed in the first row ROW1. The pixels SP disposed after the fifth row ROW5 may not be affected by the process of sensing the pixel SP disposed in the first row ROW1. Accordingly, the display device 10 may simply perform a process of sensing the pixels SP even in case that one gate line GL is shared by pixels SP of two rows.

In case that the first to third switches SW1, SW2, and SW3 receive the selection signal SEL having the high level H and the fifth switch SW5 receives the second output enable signal OE2, the first output terminal OUT1 may output an output signal having a low level, and the second output terminal OUT2 may output an output signal having a high level.

Embodiments have been disclosed herein, and although terms are employed, they are used and are to be interpreted in a generic and descriptive sense only and not for purpose of limitation. In some instances, as would be apparent by one of ordinary skill in the art, features, characteristics, and/or elements described in connection with an embodiment may be used singly or in combination with features, characteristics, and/or elements described in connection with other embodiments unless otherwise specifically indicated. Accordingly, it will be understood by those of ordinary skill in the art that various changes in form and details may be made without departing from the spirit and scope of the disclosure and as set forth in the following claims.

What is claimed is:

1. A display device comprising:

a pixel electrically connected to a first gate line and a second gate line and disposed in a first row;

a pixel electrically connected to the second gate line and a reset line and disposed in a second row after the first row;

a pixel electrically connected to a third gate line and a fourth gate line and disposed in a third row after the second row; and a gate driver supplying a first gate signal, a second gate signal, a third gate signal, and a fourth gate signal to the first gate line, the second gate line, the third gate line, and the fourth gate line and supplying a reset signal to the reset line, wherein the gate driver supplies the reset signal and the third gate signal of a same timing during an active period, supplies the reset signal having a high level and the third gate signal having a low level during a rest period, and supplies the first gate signal having a high level during a first period of the rest period, in a process of sensing the pixel disposed in the first row, the first gate signal and the second gate signal have a high level during the first period of the rest period, the second gate signal has a high level during a second period after the first period, the first gate signal and the second gate signal have a high level during a third period after the second period, and the second gate signal has a high level during a fourth period after the third period.

2. The display device of claim 1, wherein the second gate signal is delayed from the first gate signal and partially overlaps the first gate signal during the active period.

3. The display device of claim 1, wherein the reset signal is delayed from the second gate signal and partially overlaps the second gate signal during the active period.

4. The display device of claim 1, wherein the fourth gate signal is delayed from the third gate signal and partially overlaps the third gate signal during the active period.

5. The display device of claim 1, wherein in the process of sensing the pixel disposed in the first row, the reset signal has a high level during the fourth period and a fifth period after the fourth period, and the third gate signal and the fourth gate signal have a low level during the first period, the second period, the third period, the fourth period and the fifth period.

6. The display device of claim 1, wherein the pixel disposed in the first row includes:

a light emitting element;

a first transistor disposed between a driving voltage line and the light emitting element and supplying a driving current to the light emitting element;

a second transistor electrically connecting a data line and a first node that is a gate electrode of the first transistor based on the first gate signal; and a third transistor electrically connecting a sensing line and a second node that is a source electrode of the first transistor based on the second gate signal.

7. The display device of claim 1, wherein the pixel disposed in the second row includes:

a light emitting element;

a first transistor disposed between a driving voltage line and the light emitting element and supplying a driving current to the light emitting element;

a second transistor electrically connecting a data line and a first node that is a gate electrode of the first transistor based on the second gate signal; and a third transistor electrically connecting a sensing line and a second node that is a source electrode of the first transistor based on the reset signal.

8. A display device comprising:

a pixel electrically connected to a first gate line and a second gate line and disposed in a first row;

a pixel electrically connected to the second gate line and a reset line and disposed in a second row after the first row;

a pixel electrically connected to a third gate line and a fourth gate line and disposed in a third row after the second row; and a gate driver supplying a first gate signal, a second gate signal, a third gate signal, and a fourth gate signal to the first gate line, the second gate line, the third gate line, and the fourth gate line and supplying a reset signal to the reset line, wherein the gate driver includes:

a first stage and a second stage supplying signals;

a first switch electrically connected to the first stage or the second stage based on a selection signal;

a second switch electrically connected to the first stage or the second stage based on the selection signal;

a third switch receiving the selection signal and electrically connected to a second output terminal;

a fourth switch electrically connecting the first switch to a first output terminal and the third switch based on a first output enable signal; and a fifth switch electrically connecting the second switch to the third switch based on a second output enable signal.

9. The display device of claim 8, wherein the first switch receives a selection signal having a low level to electrically connect the first stage to the fourth switch, the second switch receives the selection signal having the low level to electrically connect the first stage to the fifth switch, and the third switch receives the selection signal having the low level to electrically connect the fourth switch to the second output terminal.

10. The display device of claim 9, wherein in case that the first switch, the second switch, and the third switch receive the selection signal having the low level and the fourth switch receives the first output enable signal, the first output terminal and the second output terminal output output signals having a high level.

11. The display device of claim 9, wherein in case that the first switch, the second switch, and the third switch receive the selection signal having the low level and the fifth switch receives the second output enable signal, the first output terminal and the second output terminal output output signals having a low level.

12. The display device of claim 8, wherein in case that the first switch, the second switch, and the third switch receive the selection signal having a high level and the fourth switch receives the first output enable signal, the first output terminal outputs an output signal having a high level, and the second output terminal outputs an output signal having a low level.

* * * * *